United States Patent [19]

Perkins

[11] 4,336,771
[45] Jun. 29, 1982

[54] SOLID FUEL BURNING INTERNAL COMBUSTION ENGINE

[76] Inventor: Charles M. Perkins, R.F.D. 4, Albion, Ill. 62806

[21] Appl. No.: 168,596

[22] Filed: Jul. 14, 1980

[51] Int. Cl.³ .............................................. F02B 45/02
[52] U.S. Cl. .............................. 123/23; 123/198 DA
[58] Field of Search ............... 123/23, 24, 250, 41.35, 123/41.39, 196.17, 198 A, 198 DA

[56] References Cited

U.S. PATENT DOCUMENTS

| | | | |
|---|---|---|---|
| 1,597,297 | 8/1926 | Shore | 123/250 |
| 1,914,672 | 6/1933 | Pawlikowski | 123/23 |
| 3,981,277 | 9/1976 | Abom | 123/23 |
| 4,204,506 | 5/1980 | Bowling | 123/23 |

FOREIGN PATENT DOCUMENTS

| | | | |
|---|---|---|---|
| 2541616 | 3/1977 | Fed. Rep. of Germany ... | 123/41.39 |
| 463283 | 3/1937 | United Kingdom ................. | 123/23 |

Primary Examiner—Craig R. Feinberg
Attorney, Agent, or Firm—Robert K. Youtie

[57] ABSTRACT

An internal combustion engine adapted to burn solid fuel including a piston-and-cylinder assembly including a valved inlet for combustion supporting air, a valved outlet for exhaust of combustion products, ignition means and a fuel valve for retaining a quantity of solid fuel out of the cylinder and opening on pressure reduction in the cylinder by piston movement beyond top dead center to introduce the quantity of fuel into the cylinder.

8 Claims, 2 Drawing Figures

SOLID FUEL BURNING INTERNAL COMBUSTION ENGINE

BACKGROUND OF THE INVENTION

As is well known, liquid fuels such as oil and gasoline are becoming scarce and expensive, while solid fuels such as coal, pulverized vegetation, and the like remain abundant but more difficult to use in internal combustion engines. That is, solid fuels have heretofore been both difficult to accurately meter and feed, while likely to cause substantial wear on the engine parts. Further, the prior art has not provided a simple, but highly effective means for feeding solid fuel in an engine which can be converted to the use of semi-solid, liquid and solid fuels.

SUMMARY OF THE INVENTION

Accordingly, it is an important object of the present invention to provide an internal combustion engine construction which overcomes the above mentioned difficulties, reliably and efficiently feeds solid fuels to an internal combustion engine, to produce highly efficient conversion from thermal to mechanical energy, and wherein unique means are provided to minimize wear by particulate fuel and fuel residues.

It is still another object of the present invention to provide a thermally efficient engine having the advantageous characteristics mentioned in the preceding paragraph, which may be effectively converted for use with different fuels, and which advantageously conjointly employs power cylinders having fuel ignition, and air compression cylinders driven by the power cylinders to compress air and feed the same to effectively supercharge the power cylinders.

It is still another object of the present invention to provide a solid fuel burning internal combustion engine which overcomes the difficulties mentioned hereinbefore, is extremely simple in construction and operation for long continued reliable usage, and which is adapted for economical manufacture, maintenance and use.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENTS

Figure 1:
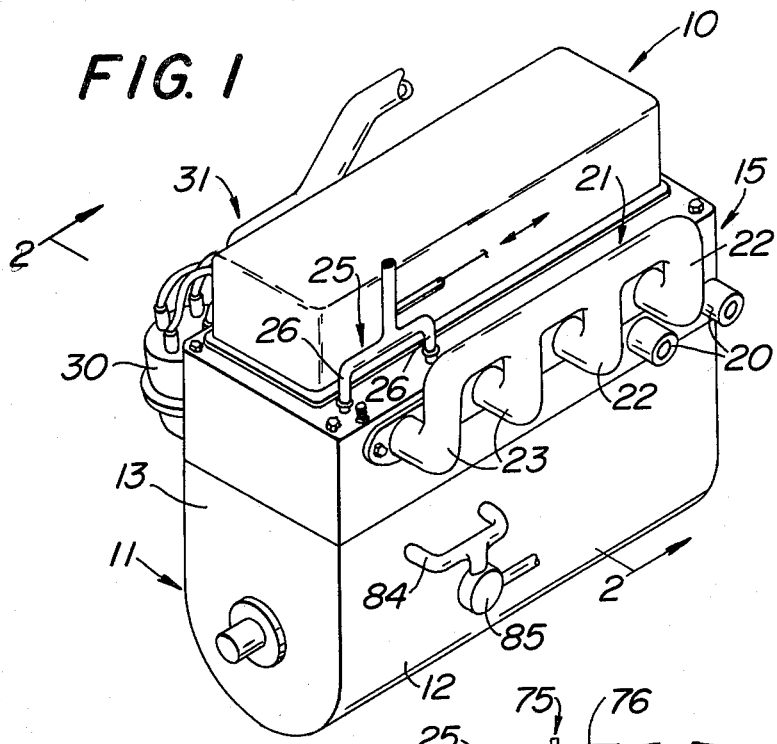
FIG. 1 is a top perspective view showing an internal combustion engine of the present invention apart from driven machinery.

Referring more particularly to the drawings, and specifically to FIG. 1 thereof, an internal combustion engine is there generally designated 10, which may conventionally include a block 11 defining in its lower region a crank case 12 and its upper region 13 defining internal cylinders. The block of the present invention may be of an in-line four cylinder construction, or other arrangement, as will appear more fully hereinafter. Superposed on and bolted to the block 11 may be a head 15 closing the upper ends of the cylinders, and provided on its upper side with a valve cover 16.

The illustrated embodiment, being a four cylinder, in-line block may have a forward pair of power cylinders, in which occurs internal combustion, and a rearward pair of compression cylinders, in which occurs compression of air for supporting the internal combustion.

More specifically, the rear cylinders may be provided with atmospheric air inlets, as at 20, for passing air into the rear compression cylinders, and an air manifold 21 for passing compressed air from the rearward, compression cylinders, to the forward power cylinders. In particular, the compression cylinders may be suitably valved, say including one-way valves in inlets 20, to receive and compress atmospheric air, and then transfer compressed air, as through conduits 22 of manifold 21 to manifold conduits 23 which open to respective forward power cylinders.

A fuel conduit is generally designated 25, including a pair of fuel pipes 26 for conducting fuel to respective power cylinders. A suitable ignitor, as at 28 in FIG. 2, may be a spark plug, hot bulb, or the like, and is provided in each power cylinder 29, if desired, to aid ignition. Additional ignition means, such as a distributor 30 may be associated with the ignitors 28, if desired.

Also connected in fluid communication with the cylinder head 15 may be a suitable exhaust system 31.

Figure 2:
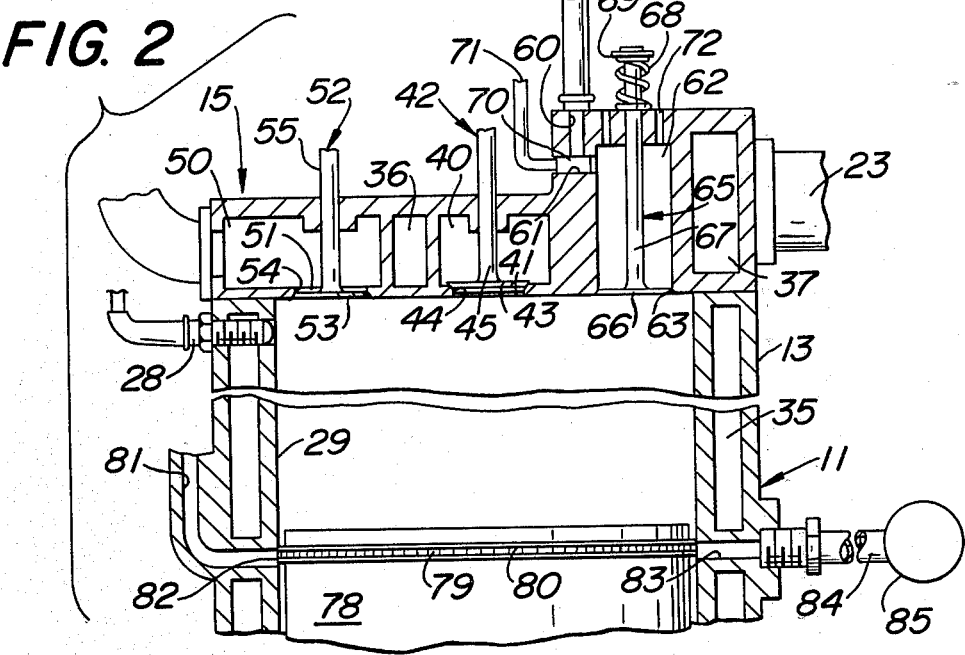
FIG. 2 is a partial, sectional elevational view taken generally along the line 2—2 of FIG. 1, illustrating interior construction of the instant invention, somewhat diagrammatically and broken away to conserve drawing space.

As seen in FIG. 2, the upper block region 13 bounding each power cylinder 29 may be of a double wall or jacketed construction defining suitable liquid cooling chambers 35. The head 15 may also be provided with coolant passageways, as at 36 and 37. Further, the head 15 is formed with an air inlet passageway 40 communicating with the manifold conduit 23, and having a valve opening 41 communicating between the passageway 40 and interior of power cylinder 29. An air inlet valve 42 includes a valve element 43 shown in the opening 41 seated in closing relation thereto on the valve seat 44. The valve 42 includes a stem 45 extending slidably upwardly through and beyond the head 15 for reciprocatory operation by suitable valve operating means, such as overhead cams, or other.

Additionally, each power cylinder 29 is provided in the cylinder head 15 with an exhaust passageway 50 in fluid communication with the exhaust manifold 31 and having an opening 51 communicating with the interior of the respective power cylinder. An exhaust valve 52 is mounted in the cylinder head 15, in association with each power cylinder 29, including a valve element or head 53 movable into and out of closing relation with a valve seat 54 bounding outlet opening 51, and further including a valve stem 55 upstanding from the valve head slidably through the cylinder head for actuation by the valve operating means. The inlet valve 42 and outlet valve 52 are operated in suitably timed relation to achieve the desired admission of compressed air through air inlet opening 41 and exit of combustion products through exhaust opening 51.

Each fuel inlet nipple or pipe 26 communicates gravitationally downwardly through a vertical passageway or bore 60 into a generally horizontal slideway 61. The slideway 61 opens into a fuel feeding or dispensing passageway 62, which communicates downwardly through a fuel inlet opening bounded by a valve seat 63 with the interior of power cylinder 29. A fuel valve 65 includes a valve element or head 66 shiftable into and out of closing relation with respect to the valve seat 63, and having a valve stem 67 upstanding through the cylinder head 15 and there provided with a coil compression spring 68 bearing against an end abutment 69 to urge the valve 65 resiliently upwardly to its closed position, as illustrated.

A fuel feeder or pusher 70 is slidable in slideway 61 between an extended position, as shown in FIG. 2, closing the lower end of bore 60, and a retracted position opening the bore to the slideway 61. A stem or shank 71 extends from the pusher or slide 70 for operative connection to suitable cam means, or other operating means, to shift the slide 70 between its closed and open positions in properly timed relation.

An additional valve 75, such as gate valve, or other, is mounted in the fuel feed manifold or conduit 25, and provided with an actuating member 76 for remote actuation of the valve 75. The valve 75 controls the rate of flow of fuel, which may be particulate fuel, in the manner of a throttle.

Conventionally mounted internally within each power cylinder 29 is a power piston 78, which may include a piston ring 79 mounted in a piston ring groove 80. Of course, more than one piston ring may be provided in the piston 78 if desired. An oil feed passageway 81 is provided in the wall of each power cylinder 29, opening laterally into the cylinder, as at 82, at a level approximating the lower dead center position of the uppermost piston ring 79, as illustrated in FIG. 2. Opposite each oil inlet opening 82, the associated cylinder 29 is provided with an oil outlet passageway 83 which communicates through the wall of the power cylinder, as through an exhaust manifold 84 to a withdrawal pump or suction source 85.

In operation, as with particulate, semi-solid or liquid fuel, the fuel flows gravitationally downwardly through conduit 26 and bore 60 at a rate controlled by the position of throttle valve 75. During each operating cycle the slide or pusher 70 is withdrawn to feed a metered quantity of fuel downwardly into guideway or opening 61, where is pushed by return, closing movement of pusher 70 into fuel passageway 62 onto the upper or inner side of the fuel valve element or head 66.

A relatively high top dead center position of piston 78 may be achieved, as by the recessed, closed positions of air inlet valve 42 and fuel valve 65, for maximum displacement per cycle. Upon initial downwardly piston movement from its top dead center position, a suction is created in cylinder 29 above the piston which opens fuel valve 65, displacing the valve head 66 downwardly for free flow of the quantity of fuel previously retained in the passageway 62 by the valve head. That is, fuel flows from the top or inner side of valve head 66, both by gravity and the rush of air from passageway 62 to the low pressure upper region of cylinder 29.

Immediately upon the deposit of fuel in the cylinder 29, the air inlet valve 42 opens to pass relatively high pressure air from the compression cylinders, through air manifold 21 and air conduit 40 into the power cylinder to support combustion of the fuel during a power stroke. The combustion may be initiated by the ignitor 28, or by the temperature of the combustion air. After the power stroke, the piston 78 returns upwardly and exhaust valve 52 is opened to pass the products of combustion. Substantial clearing of the combustion products is achieved by the relatively high top dead center position of the piston. During the combustion and exhaust, an additional metered quantity of fuel has been fed to the passageway 62, for retention therein by the closed valve 65 and repetition of the above described cycle. While a two cycle operation has been described, it is, of course, appreciated that other than a two cycle operation may also be employed.

As a solid fuel, or partially solid fuel, such as a slurry, or the like, may leave ash in the cylinder and accumulate on the piston rings, this would result in undue piston and cylinder wear. To avoid this wear, the piston ring cleaning system of oil openings 82 and 83, and suction means 84 and 85, may be employed. In particular, the oil inlet passageway 82 opens to the piston ring 79 on one side of the piston, for movement therealong under the vacuum or suction of pump 85 to convey ash, and like combustion products away from the piston through oil outlet passageway 83, manifold 84 and suction pump 85.

If desired, the combustion supporting, compressed air entering through passageway 40 upon elevation of valve 42 may be heated, as by exhaust gases for greater efficiency, or cooled for less pollution, as desired. Also, the fuel retaining passageway 62 may be open to the atmosphere, as at 72, or to exhaust gases if desired, to assure complete removal of fuel from the passageway upon each cycle, and comply with exhaust gas recycling requirements.

From the foregoing, it is seen that the present invention provides an internal combustion engine which is capable of operation with a wide variety of fuels, which may be solid and very low cost waste materials, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A solid fuel burning internal combustion engine comprising a power cylinder, a head closing one end of the power cylinder, a power piston reciprocable in said power cylinder toward and away from said head, an inlet valve in said head for passing air into said power cylinder, an exhaust valve in said head for passing combustion products from said power cylinder, a fuel valve in said head for retaining a quantity of fuel and opening on pressure reduction in said power cylinder to introduce said quantity of fuel to said power cylinder, ignition means in said cylinder for igniting said fuel, and including at least one piston ring, and piston ring cleaning means comprising an inlet oil passageway communicating with said power cylinder at bottom dead center of said piston ring via a first port, an outlet oil passageway communicating with said power cylinder at bottom dead center of said piston ring remote from said inlet oil passageway via a second port, wherein said first and second ports are within a plane defined by said piston ring, and oil moving means communicating with said inlet and outlet oil passageways along said plane of said piston ring for moving oil and combustion products from said piston ring.

2. An internal combustion engine according to claim 1, said oil moving means comprising suction pump means communicating with said outlet oil passageway for effectively removing oil and combustion waste.

3. An internal combustion engine according to claim 1, in combination with a source of air under pressure connected to said inlet valve for admission to said power cylinder after introduction of fuel to close said fuel valve and support fuel combustion.

4. An internal combustion engine according to claim 3, said exhaust valve being recessed into said head for maximum top dead center piston position.

5. An internal combustion engine according to claim 3, said source comprising a compression cylinder, a compression cylinder head closing one end of said compression cylinder, a compression piston reciprocable in said compression cylinder, an air inlet communicating between said compression cylinder and the atmosphere, an air outlet communicating between said compression cylinder and said power cylinder through said inlet valve, and crank shaft means operatively connected to both said power piston and compression piston, to operate the latter by the former.

6. An internal combustion engine according to claim 3, said head having a fuel passageway opening downwardly into said power cylinder, and said fuel valve comprising a valve element in said fuel passageway for retaining said fuel quantity and opening downwardly for introducing said fuel quantity under suction by said piston.

7. An internal combustion engine according to claim 6, in combination with a fuel pusher mounted in said head for movement toward and away from said fuel passageway, and a fuel metering dispenser for metering said quantity of fuel into position ahead of said pusher for displacement into said passageway.

8. An internal combustion engine according to claim 7, said metering means comprising a gate selectively positionable to vary said fuel quantity.

* * * * *